Patented Aug. 24, 1937

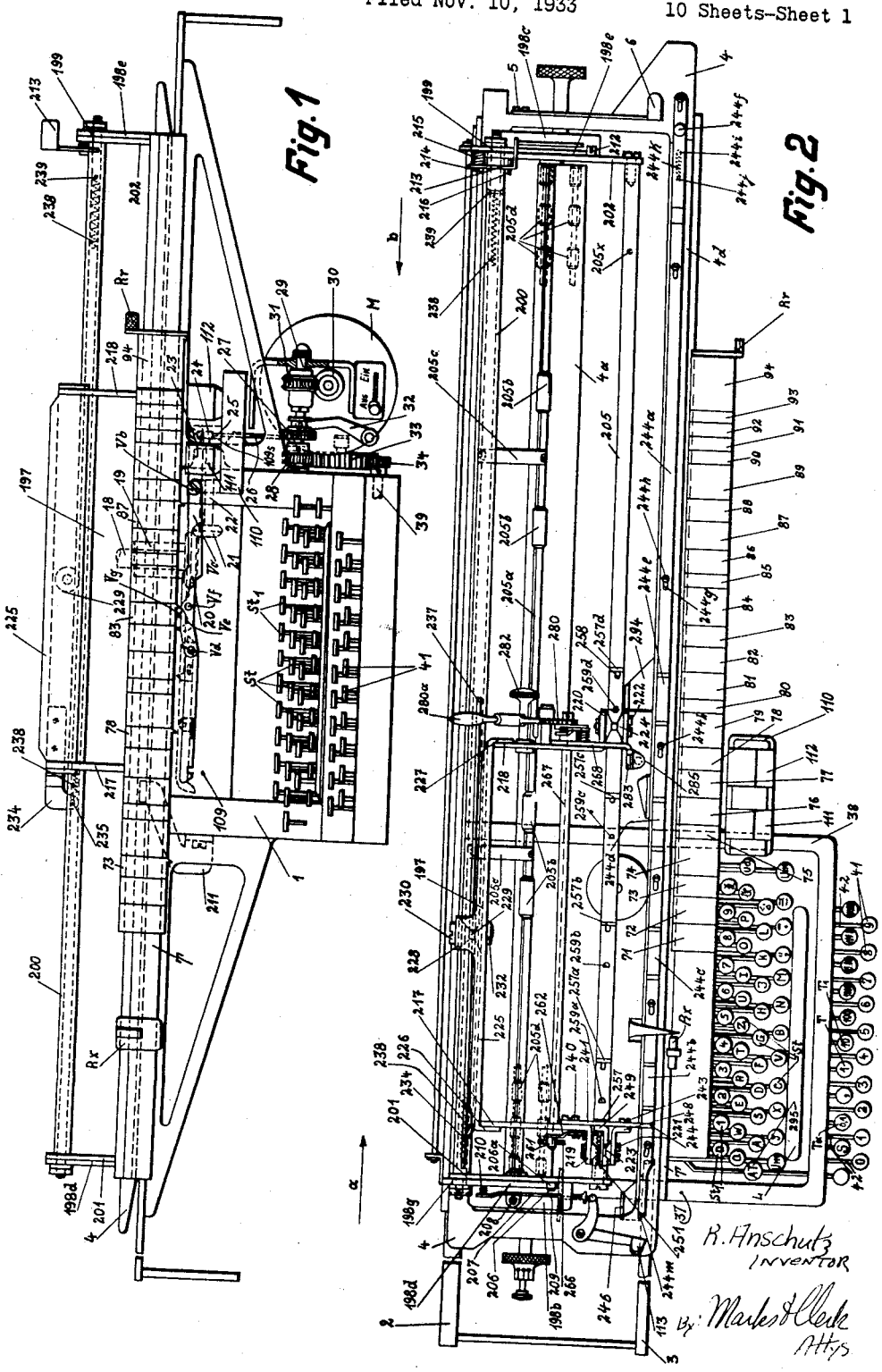

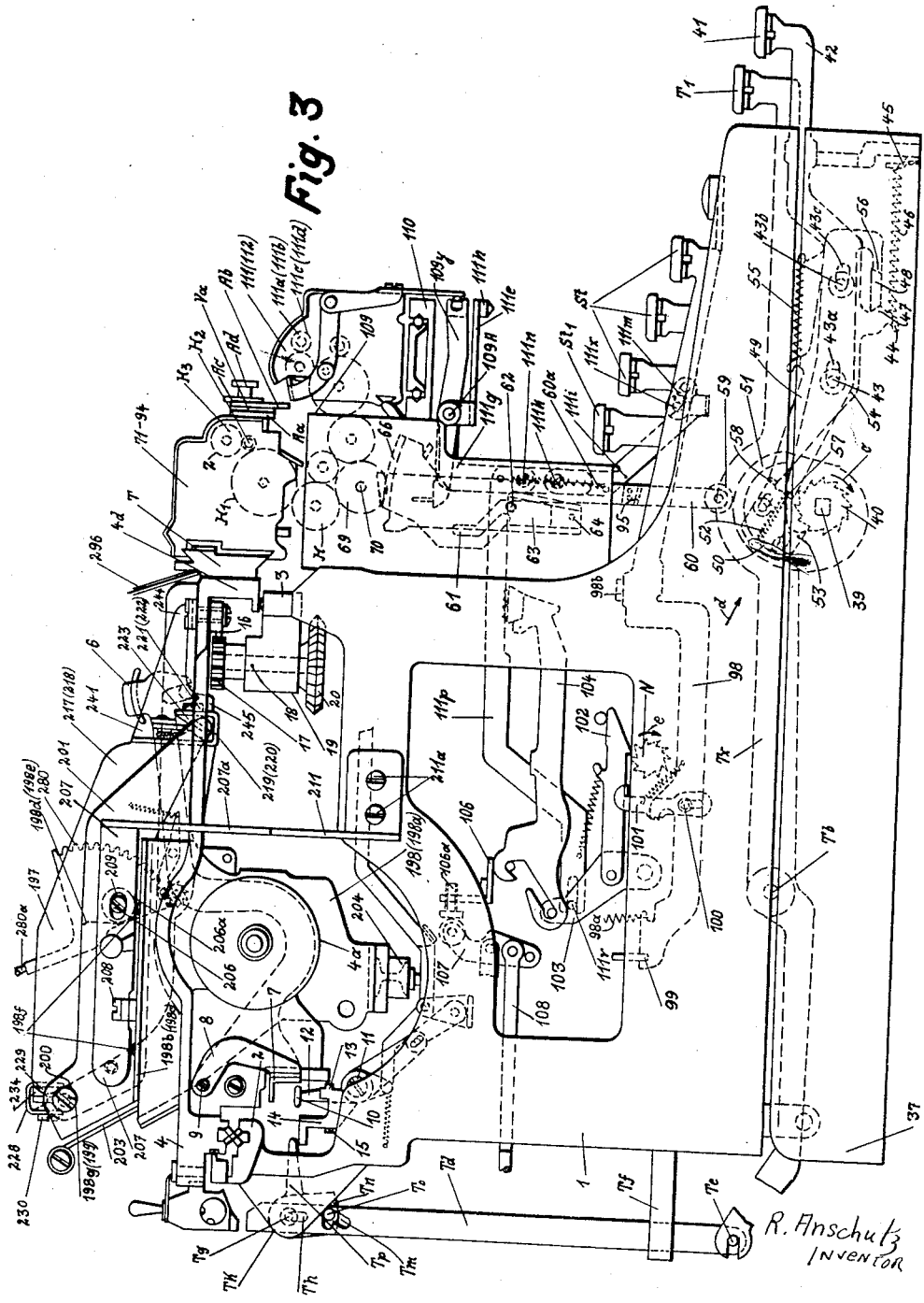

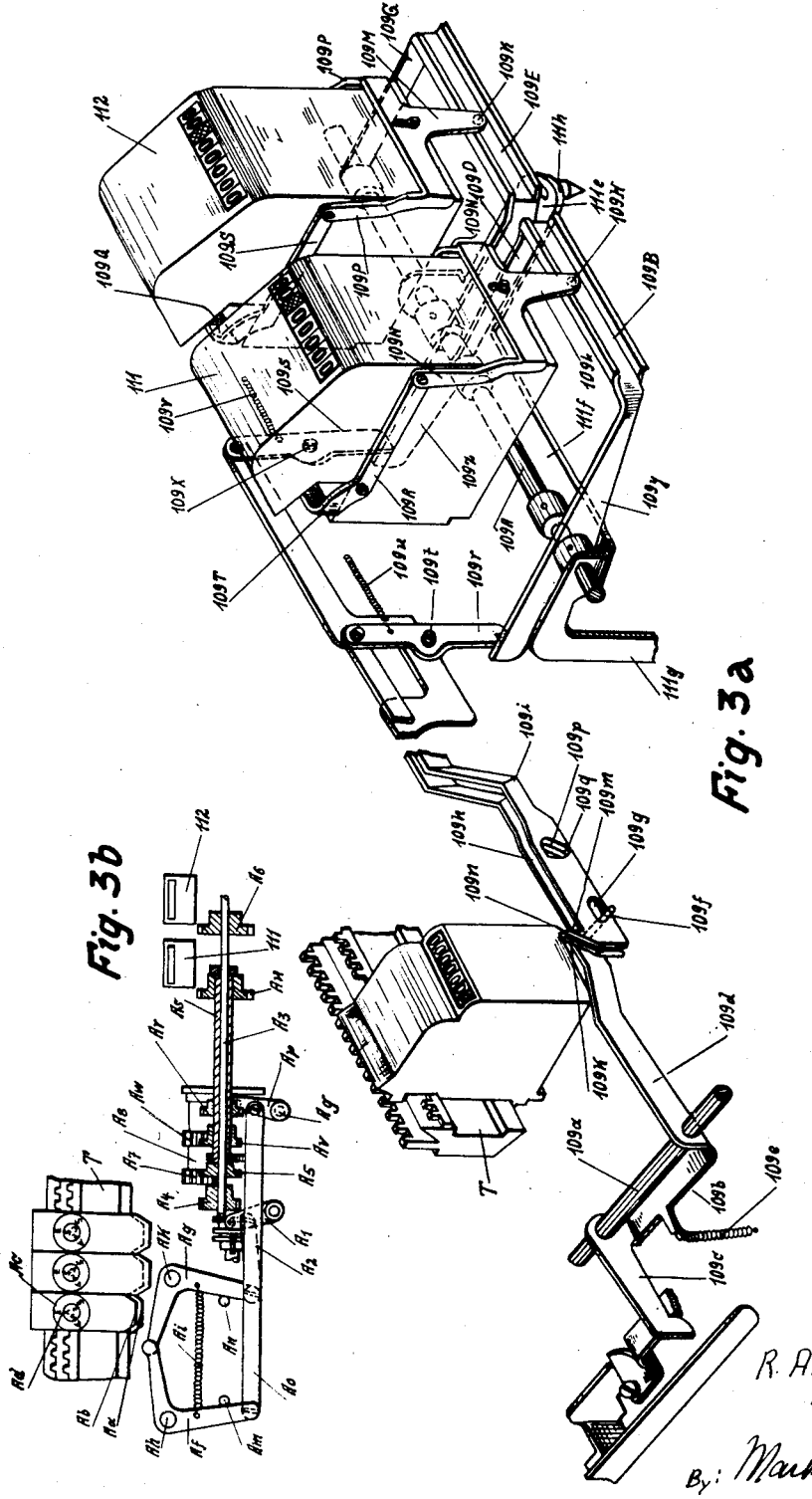

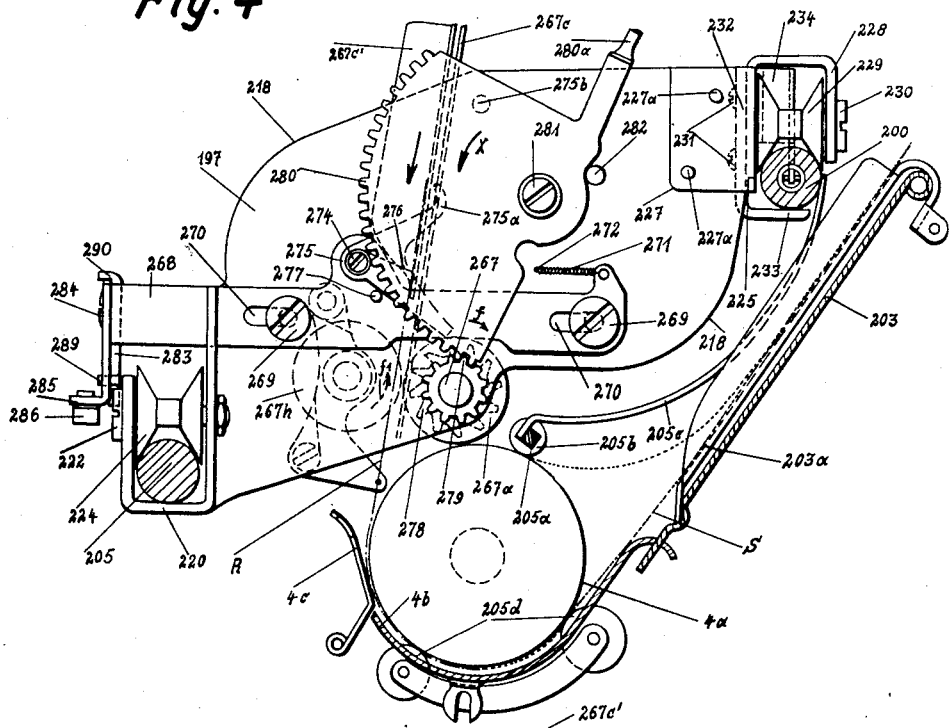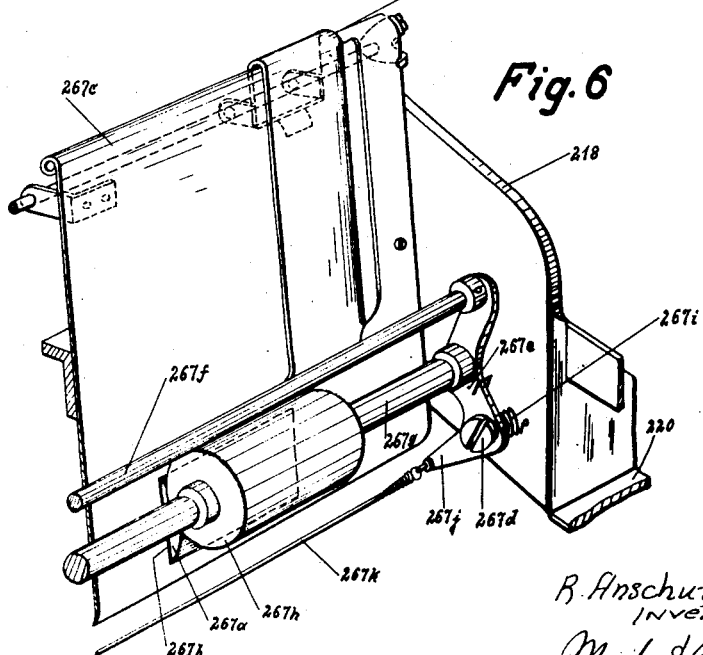

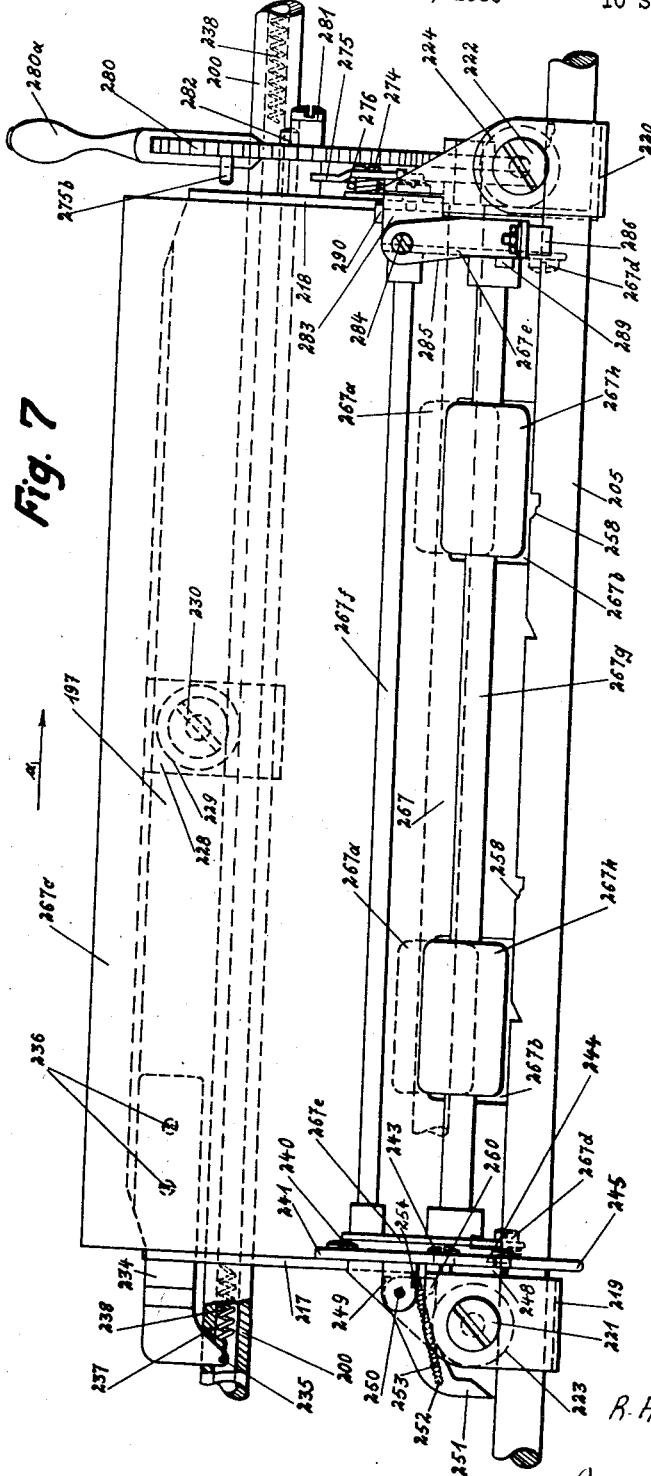

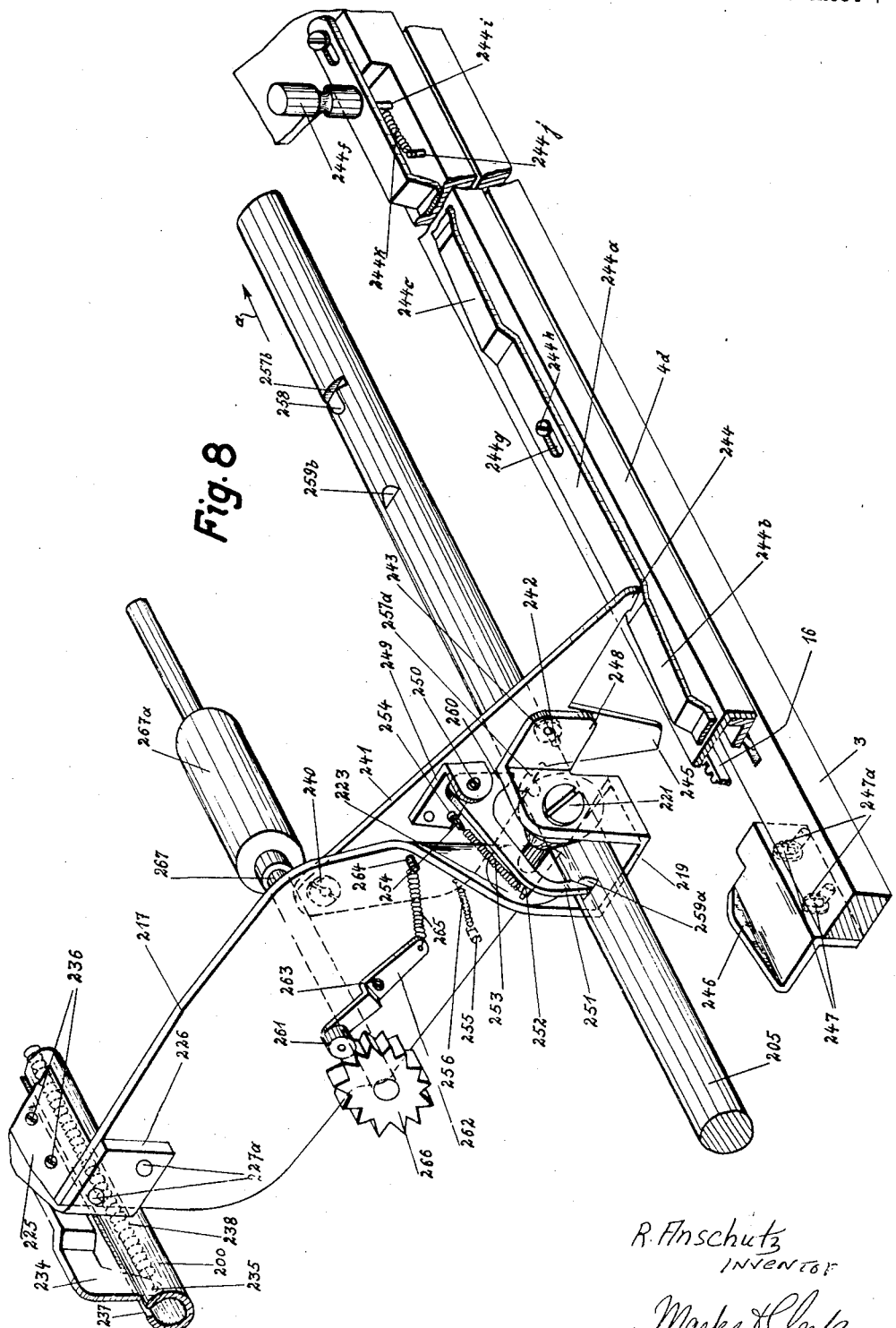

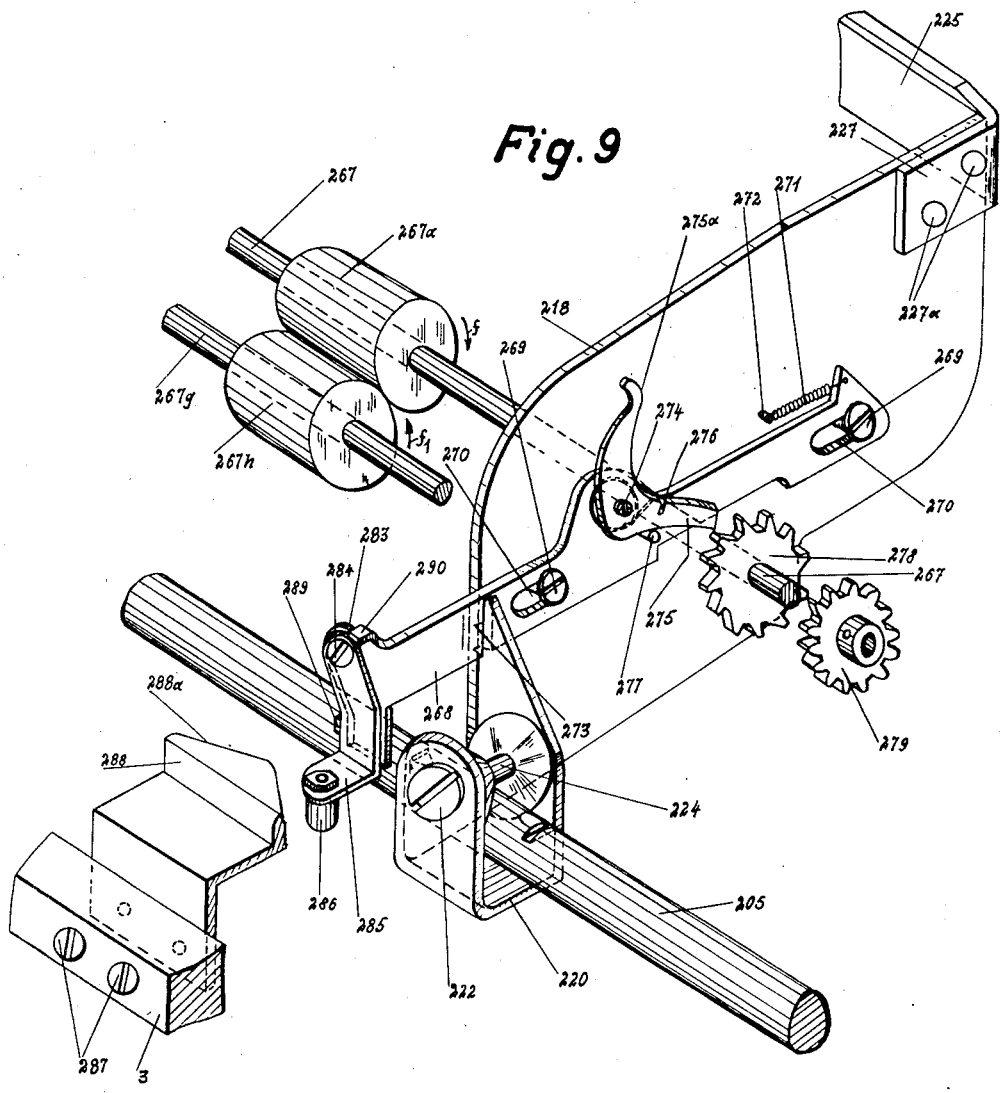

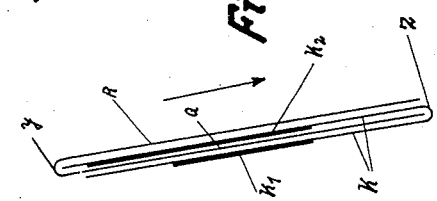

2,091,133

UNITED STATES PATENT OFFICE 2,091,133

TYPEWRITING-CALCULATING MACHINE, TYPEWRITING MACHINE, OR THE LIKE

Robert Anschütz, Zella-Mehlis II, Germany, assignor to Mercedes Buromaschinen-Werke Aktiengesellschaft, Benshausen, Zella-Mehlis, Germany Application November 10, 1933, Serial No. 697,521
In Germany November 22, 1932

16 Claims. (Cl. 197—127)

The invention relates to a typewriting-calculating machine, typewriting machine or the like, having a device which carries the paper sheet and which is displaceable within a pre-determined zone jointly with the main or totalizer carriage and also independently of this carriage.

According to the invention, this device is formed by a carriage displaceably arranged in the main or totalizer carriage, and provided with a pair of rollers for holding and forwarding the paper sheet, while the platen with its paper guides is arranged in the main or totalizer carriage.

The day-book or like sheet is advantageously arranged in the main or totalizer carriage, while the sheets superposed thereon are arranged in the carriage which is displaceable in relation to the main or totalizer carriage.

This has the advantage that several lines arranged one beneath the other on the original sheet can be copied through on to a single line of a day-book or like sheet whereby a long-felt disadvantage in practice is remedied.

In the drawings one form of construction of the invention is illustrated by way of example.

Figure 1 shows a front elevation of a power-driven typewriting calculating machine, provided with a device according to the invention.

Figure 2 shows a plan according to Figure 1 in which, however, the left-hand part of the frame is represented as interrupted on account of its length. The totalizer carriage running on the rails of the frame is moved into its extreme right-hand position and the paper carriage running in the totalizer carriage takes up likewise its extreme right-hand position in relation to the frame.

Figure 3 shows a side elevation of Figure 1, viewed in the direction of the arrow "*a*".

Figure 3a is a perspective view taken from the front left-hand side of the "clear sign" impression device with the two cross totalizers.

Figure 3b is a diagrammatic front elevation of the totalizer rail arranged in a combined typewriting and calculating machine with three column totalizers and the driving members for the cross totalizers.

Figure 4 shows a side elevation of the paper carriage viewed in the direction of the arrow "*b*" in Figure 1.

Figure 6 shows a perspective part elevation of the paper forwarding means of the paper carriage viewed from the front left-hand side of Figure 1.

Figure 7 shows a front elevation of the paper carriage running in the totalizer carriage according to Figure 1.

Figure 8 shows a perspective elevation, viewed from the front left-hand side of the machine, of a detail of the paper carriage.

Figure 9 shows a perspective elevation, viewed from the front right-hand side of the machine, of a detail of the paper carriage.

Figures 11 and 12 show two forms, the filling-in of which is rendered possible by the invention.

Figure 13 shows the interleaving with carbon paper of the top forms.

Figure 5:
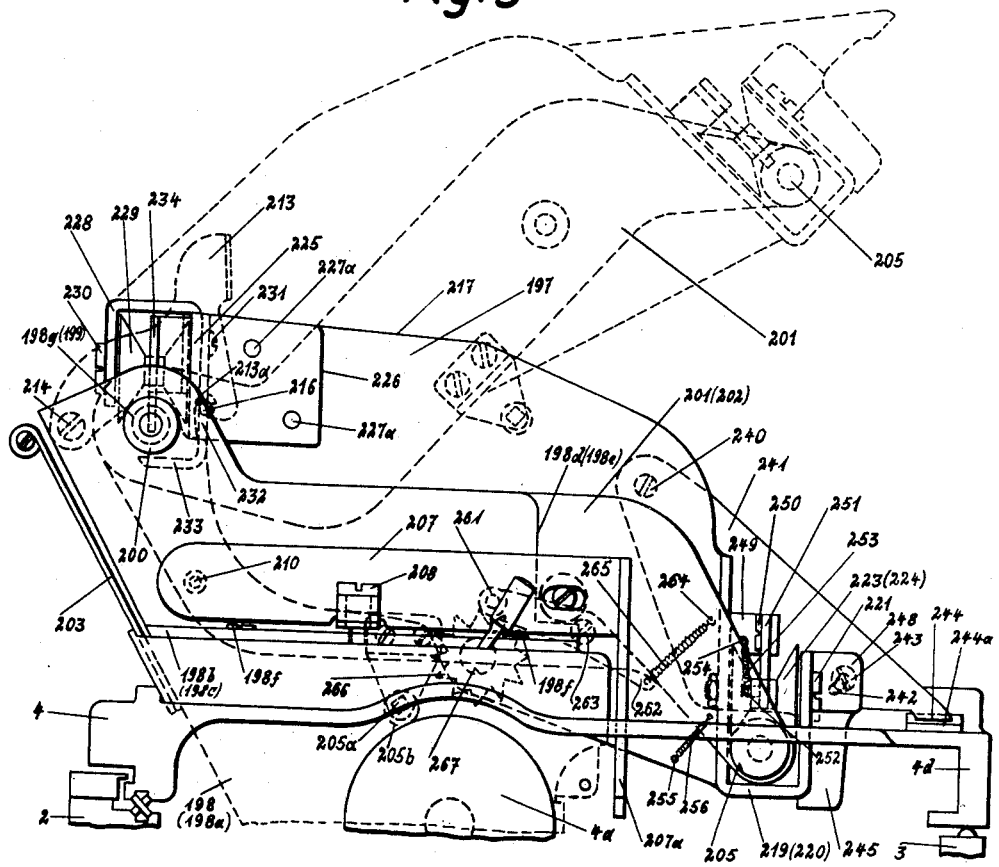
Figure 5 shows a side elevation of the paper carriage viewed in the direction of the arrow "*a*" in Figure 1.

The operation of the known Mercedes-Addelektra typewriting-calculating machine with which, in the present case, the invention is incorporated by way of example, is as follows:

The machine frame, 1, (Figure 3) carries by means of the running rails, 2 and 3, (Figures 2 and 5) in a known manner, a main or totalizer carriage 4, (Figures 1 and 2), which, for example, may be 85 cm. long, and in which a platen, 4a, is arranged. On the right-hand side of the main carriage, 4, a carriage-release lever, 6, is mounted by means of a screw, 5, (Figure 2), so as to be capable of swinging downwards and to the extension of this lever a carriage-release rail, 7, (Figure 3) is attached. This is rigidly connected on its other side with a lever, 8, (Figure 3) which is arranged on the left-hand side of the main carriage, 4, so as to be capable of swinging round a screw, 9. If the carriage-release lever, 6, is depressed, then the carriage-release rail, 7, acts through the parts, 10 to 15, on the loose shift-tooth (not shown) of the known escapement in the dis-engaging sense whereby the main carriage, 4, may be moved freely to the right or left.

In order to return the main carriage, 4, and to effect the line-shifting of the platen, 4a, a rack, 16, (Figure 3), is mounted on the underside of the front bridge, 4d, of the main carriage, 4, so as to be longitudinally displaceable. With the rack, 16, engages a toothed wheel, 17, which is pinned on the shaft, 18. This shaft is rotatably mounted in a stationary bearing, 19, and carries a bevel wheel, 20, (Figures 1 and 3) rigidly fixed on its end opposite to that which carries the toothed wheel, 17. With the bevel wheel, 20, a bevel wheel, 21, (Figure 1), engages, the latter wheel being fixed to one end of a shaft, 22. The shaft, 22, is rotatably mounted in a bearing, 23, fixed to the machine frame, and on its other end is provided with a spur wheel, 24, which meshes with a spur wheel, 25, the latter wheel in turn meshing with a spur wheel, 26, which engages with a spur wheel, 27, formed as one part of a coupling. This is arranged so as to be loosely rotatable and axially displaceable on a part 29, (Fig. 1) of a cam shaft "N" (Figure 3), which drives the type levers. Further, on the part, 29, a second coupling half is fixed and is formed likewise as a spur wheel, 28, but is not axially displaceable. The shaft, 29, is rotated in the direction of the arrow "e" (Figure 3) by means of a worm, 30, and a worm-wheel, 31, which are driven by a motor "M".

The return of the carriage, as known, is effected in this manner, that the coupling half, 27, is brought into engagement with the coupling half, 28, by a lever, 32, which is actuated by the right-hand margin setter, Rr, through a suitable set of rods (not shown) whereby, by means of the above mentioned wheel drive, 17 to 27, and the rack, 16, a line-shift lever, 113, is actuated and the return of the carriage, 4, to the right, takes place. The line-shift lever, 113, acts besides, on a part belonging to the invention to be later described. The opening of the carriage return coupling, 27, 28, is then effected through the left-hand margin setter, Rx, (Figures 1 and 2) on the arrival of the main carriage, 4, into its extreme right-hand position, whereby the return movement is interrupted.

In the side walls, 37 and 38, (Figure 2) of the frame, 1, the driving shaft, 39, (Figure 3), for the calculating mechanism drive is mounted. This shaft is rotated in the direction of the arrow "c", through the spur wheels, 28, 33, and 34, (Figure 1), which are driven from the motor "M", through the worm, 30, and the worm wheel, 31.

The ratchet wheel, 40, (Figure 3), is arranged on the shaft, 39, and participates in its movement. A similar ratchet wheel, 40, is provided for each of the ten calculating keys, 41. The calculating key levers, 42, are mounted on the machine frame, 1, in such a manner that they can pivot around the shaft, 43, and are held in the position shown in Figure 3, by the springs 46, which are attached at one end to the hooks, 44, of the calculating key levers, and at the other end, to the fixed hooks, 45, this position being determined by the contact of the noses, 47, on the calculating key levers with the stop bar, 48.

If a key, 41, is depressed, then the key lever, 42, pivots around the shaft, 43, in a clockwise direction, and its arm, 49, which extends in a rearward direction releases the pawl, 50, which is slidably mounted on the cam, 51, the latter being mounted on the shaft, 39, in such a manner that is can rotate freely thereon. In consequence of this the pawl, 50, under the action of the compression spring, 52, which acts upon it, moves in the direction of the arrow "d", and its nose, 53, engages with the continuously rotating ratchet wheel, 40. This engagement causes the cam, 51, which corresponds to the depressed key, 41, to be coupled to the ratchet wheel, 40, and therefore with the shaft, 39, for one revolution only.

The swinging movement of the lever, 42, also causes a member, 54, which is slidably mounted on the lever by means of the pin-and-slot connections, 43, 43a, and 43b and 43c, to be moved towards the left so that the hook, 56, engages under the stop bar, 48, by the action of the spring, 55, which at one end is connected to the member, 54, and at the other end to the arm 49 of the lever, 42. The nose, 57, of the member, 54, is thereby caused to move into the path of the nose, 58, of the pawl, 50, which in the meantime has been released and has moved past the arm, 49, and the nose, 57, in the direction of the arrow "c", and the key lever, 42, is locked in its depressed position by the nose 56, of the member, 54. The revolution of the cam, 51, causes the differential member, 60, the roller, 59, of which contacts with the cam, to move in a downwards direction under the action of the spring, 60a, and is thereafter moved upwards by the rotating cam, 51. The movement of the differential member, 60, causes a slot, 61, therein, which slot is shaped to correspond to the value of the particular key, 41, depressed, to act upon a shaft, 62.

On depressing a calculating key, 41, as known, a cam, 51, performs a single revolution whereby a differential member, 60, the roller, 59, of which is maintained in contact with the cam, 51, by the action of a spring, 60a, executes an upward and downward movement and whereby through the parts, 61 to 64, 66, 69, 70, and H to H3, the value corresponding to the depressed key is registered either additively or subtractively in the column totalizer which for the time being is in the working position. By means of the train of wheels indicated diagrammatically in Figure 3, the value corresponding to the depressed key is also registered in the cross totalizers 111 and 112.

After the cam, 31, has made a complete revolution, the nose, 58, of the pawl, 50, abuts against the nose, 57, of the member, 54, whereby the cam, 51, is disengaged from the ratchet wheel, 40. The contact of the pawl, 50, with this nose, 57, of the member, 54, causes the latter also to move against the action of the spring, 55, into the position shown in Figure 3, which returns the key lever, 42, into its rest position and retains the cam, 51, by means of its arm, 49, instead of this retention being effected by the nose, 57, of the member, 54.

On the different member, 60, is fixed an angle member, 95, (Figure 3), which, when the differential member moves downwards, acts upon the type key lever, 98, corresponding to it which lies normally, under the action of its spring, 98a, against the stop bar, 98b, and swings the type key lever 98, around its pivot, 99, against the action of its spring, 98a. The pawl, 101, which is mounted on a pin, 100, on the key lever, 98, causes the coupling hook, 102, to engage with the toothed shaft, N, which rotates continuously in the direction of the arrow, "e", so that the coupling hook, 102, is moved by the toothed shaft towards the right, (Figure 3).

The above movement of the coupling hook, 102, causes, by means of an intermediate lever, 103, the type lever, 104, to strike against the platen, 4a, in this manner, the amount registered is printed. The type lever, 104, acts in a known manner through the parts, 106 to 108, (Figure 3), on the carriage escapement, whereby the carriage, 197, and 4, are moved one step towards the left by means of the usual spring drum.

In the front of the machine frame, 1, the totalizers are mounted, and on its front wall, 109, (Figures 1, 3, and 3a) is arranged a bracket, 110, which supports two cross totalizers, 111 and 112, which are movable together in a lateral direction. With each of the cross totalizers, 111 and 112, is connected a set of links for the "clear sign" impression device which in the following is shortly described for the purpose of a better understanding of the invention itself.

On a shaft, 109a, (Figures 1, 3, and 3a) which rests in supports on the machine frame, a two-armed lever, consisting of the bridge member, 109b, and arms 109c and 109d, is rotatably mounted and is acted upon by a spring 109e, in the anti-clockwise direction around the shaft, 109a. A pin, 109f, which is riveted to the arm 109d, (Figure 3a) projects into the slots, 109g, of two levers, 109h and 109i. The levers, 109h and 109i, are provided with hooks, 109k and 109m, which act in conjunction with the projections, 109n, arranged on the column totalizers, 73, 78, 83, 87, and 94. The levers, 109h and 109i, are provided with triangular openings 109p, into which projects a pin, 109q, which is fixed to the machine frame. The levers, 109h and 109i, are pivotably inter-connected with the levers, 109r and 109s, which are arranged on the machine frame in such a manner as to be capable of pivoting on the screws, 109t and 109x. The levers, 109r and 109s, are acted upon by the tension springs, 109u and 109v in a clockwise direction. The levers, 109r and 109s, co-act with the levers, 109y and 109z, which are arranged on the shaft, 109A, so that they can pivot freely thereon, the latter shaft, 109A, being arranged under the bracket, 110, (Figure 3).

The lever, 109y, is connected at its forwardly directed end, (Figure 3a) by means of a U-shaped rail, 109B, with the similarly disposed end of a lever, 109D, which is rotatably mounted on the shaft, 109A, and the lever 109z, is similarly connected by means of a U-shaped rail, 109E, with the lever, 109G, which is rotatably mounted on the shaft, 109A.

The U-shaped rails, 109B and 109E are positively connected by means of the rollers, 109H and 109K, with displaceable sliding members, 109L and 109M, which can move vertically on the front of the cross totalizers, 111 and 112. Each of the slides, 109L and 109M has two arms, 109N and 109P, which extend upwardly and which are pivotably connected with the two-armed levers 109R and 109S. The pairs of levers, 109R and 109S, are inter-connected by feeler rails, 109T and 109Q, respectively so as to form a U-bend, the feeler rails being shaped like a rake. The rails, 109T and 109Q, co-act with the number wheel driving wheels 111a, 111b, (Figure 3), which in a known manner, have a shortened tooth in the position which corresponds to the zero position of the number wheels 111c, 111d.

On the shaft, 109A, (Figure 3a), a two-armed lever consisting of a bridge member, 111f, and arms, 111e, and 111g, is rotatably mounted. The arm, 111e, is provided with a knob, 111h. To the arm, 111g, (Figure 3) which extends downwards, a lever, 111i, is connected by means of a screw, 111k, the lever at its free end being provided with a curved slot 111m. To the arm, 111g, is pivotally connected, by means of a screw, 111n, a link, 111p, the free end of which is fork-shaped and embraces a pin 111r, on the intermediate lever 103, co-acting with the type lever 104, which carries the "clear sign" type. The key lever, 98, (Figure 3), by means of which the "clear sign" type lever is struck, is not provided with a key, but is connected with the lever 111i, by means of a pin, 111x, (Figure 3), which projects into the slot 111m, on the lever 111i.

The column totalizers, 71 to 94, are provided with engaging members, Va, (Figure 3), which project into the path of a coupling member connected by means of a screw, Vb, (Figure 1), with the left-hand cross totalizer, 111. At the other end the coupling member which in the main consists of the link, Vc, engages, by means of a screw, Vd, in a horizontal slot, not shown, in the front wall, 109, of the calculating mechanism. The coupling member has further a hook, Ve, which is pivotally connected, by means of a pin, Vf, with the rod, Vc, and is maintained in its operative position by means of a spring which is not shown in the drawings. A second hook, Vg, serves, for the purpose of preventing the mechanism over-shooting its position on the return movement. The cross totalizers, 111 and 112, as well as the coupling link, Vc, are maintained in their normal position as illustrated in Figure 1, by a spring which is not shown in the drawings. The coupling links have the function of carrying the cross totalizers, 111 and 112, along with each column totalizer to the left, until the amount to be registered in the "ones" position has been registered, whereupon the cross totalizers are automatically disengaged from the column totalizers and spring back to the right under the action of their springs, after which they are carried along to the left by the next column totalizer.

By means of the two setting plates, Aa and Ab, (Figure 3), the cross totalizers, 111 and 112, are adjusted for addition, subtraction or are disengaged. The setting plate, Aa, serves to control the type of calculation in the cross totalizer, 112, and the setting plate Ab serves to control the type of calculation in the cross totalizer, 111. The setting plate Aa, is adjusted by the knob, Ac, and the setting plate, Ab, is adjusted by the knob, Ad, in the manner described in U. S. Patent 1,349,024. In this patent, the setting plates are shown in Figures 7 to 13 and designated by reference numerals 45 and 46. The setting plates, Aa and Ab, are adapted to actuate the cranked levers, Af and Ag, (Figure 3b), which are pivotably mounted on the pins, Ah and Ak, on the front wall of the calculating mechanism. The levers, Af and Ag, are acted upon by the spring Ai, in such a manner that they abut against the stop pins, Am and An, which are arranged in the machine frame, and this determines their normal position. The cranked lever, Af, is pivotably connected by means of a connecting rod, Ao, with a lever, Ap, which is pivotably mounted on the shaft, Ag. A pin, which is arranged on the lever, Ap, and which is not shown in the drawings, engages in an annular groove in a gear wheel, not shown, and which is driven through intermediate gearing by the toothed segment, 66, the above-mentioned gear wheel being normally in mesh with the gear wheel, Ar, which is secured to a hollow shaft, As. On the right-hand end of the hollow shaft, As, is secured a gear wheel, Au, which meshes correspondingly to the decimal positions, with the transmission gears of the left-hand cross totalizer, 111, as soon as the latter is carried along by a column totalizer. On the left of the gear wheel, Ar, a second gear wheel, Av, is secured to the hollow shaft, As, and is constantly in mesh with an intermediate gear wheel Aw, which is rotatably mounted on a pin. If the gear wheel, which is not shown on the drawings, is in mesh with the gear wheel, Ar, then the number wheel 111c, of the cross totalizer, 111, (Figure 3) are operated in an additive sense. If on the contrary, the said gear wheel lies between the gear wheel, Ar, and the gear wheel, Aw, then the cross totalizer, 111, is not operated at all. If, finally, the said gear wheel is meshed with the intermediate gear wheel, Ar, then the cross totalizer, 111, is actuated in a subtractive sense.

The setting plate, Aa, (Figure 3b), operates in conjunction with the cranked lever Ag. The lever Ag is pivotably connected with a lever, A1, by means of a connecting rod, A2. On the free end of the lever, A1, is arranged a pin, which is not shown in the drawings, and which engages with an annular groove on a gear wheel which also is not shown on the drawings and which is actuated by the toothed segment, 66. On a shaft, A3, a gear wheel, A4, and a gear wheel, A5, are arranged. If the gear wheel, which is not shown in the drawings, is in direct mesh with the gear wheel, A4, which occurs when the lever, A1, is in the position illustrated in Figure 3b—then the number wheels of the cross totalizer, 112, are operated in the additive sense by a gear wheel, A6, which is secured to the shaft, A3. If the above mentioned gear wheel lies between the two gear wheels, A4 and A5, then the number wheels of the cross totalizer, 112, are not actuated at all. If, however, the said gear wheel is meshed with the intermediate wheel, A7, which is loosely arranged on the pin, A8, then the number wheels of the cross totalizer, 112, are actuated in the subtractive sense through the gear wheels, A5 and A6.

The well known decimal tabulator key levers Tx are adapted to rock about a spindle Tb (Figure 3) in the machine frame and carry on their front end the keys Tl, while with their rear bifurcated end they are connected to tabulator rods Td by means of the pins Te. The tabulator rods Td are adapted to move vertically. On the one hand, the tabulator rods are guided by a bracket Tf arranged on the machine frame 1 and on the other hand, by a spindle Tg extending through longitudinal slots Th and therein said spindle Tg mounted in extensions Tk formed on the left and right hand portion of the machine frame. The tabulator rods Td are also provided with hook shaped slots Tm.

A member Tn is also adapted to rock on the spindle Tg and has a pin To which extends through all the slots Tm of the tabulator rods Td. A projection Tp of the member Tn co-operates with the lever Tg (Figure 2). When depressing a decimal tabulator key Tx, the lever 14 with its lug 15 also acts on the carriage escapement mechanism and renders the same inoperative.

The device according to the invention is now as follows.

On the horizontal limbs of the usual carriage side parts, 198 and 198a, which are interconnected by a paper guide plate, 203, (Figure 3) and a carrying rail 204, (of which parts in Figure 5 only the outline of the left-hand part is illustrated) horizontally bent-off limbs, 198b, and 198c, (Figures 2, 3, and 10) of special side walls, 198d and 198e, (Figures 1, 2, 5, and 10) are screwed on by screws 198f.

In the upper parts of the two side walls, 198d, and 198e, are holes, 198g and 199, respectively (Figures 2, 3, and 5) for the bearings of a rotatable hollow shaft, 200, (Figures 1 to 3, and 7). Within the two side walls, 198d and 198e, two further side members, 201 and 202, (Figures 1 and 2) are arranged, which at their upper rear ends are rigidly fixed to the hollow shaft, 200, and at their lower front ends are rigidly fixed to a shaft, 205, (Figures 2, 4, 7, 8, and 9) so that the whole forms a rigid frame, 201—205—202, which together with the hollow shaft, 200, is consequently capable of being swung in the holes, 198g and 199. On definite grounds to be explained later, the frame, 201—205—202, however can only be swung upwards in the extreme right-hand position of the carriage frame 4. In order to lock the frame 201—205—202, in every other position of the carriage frame, 4, the following locking device is provided.

Figure 10:
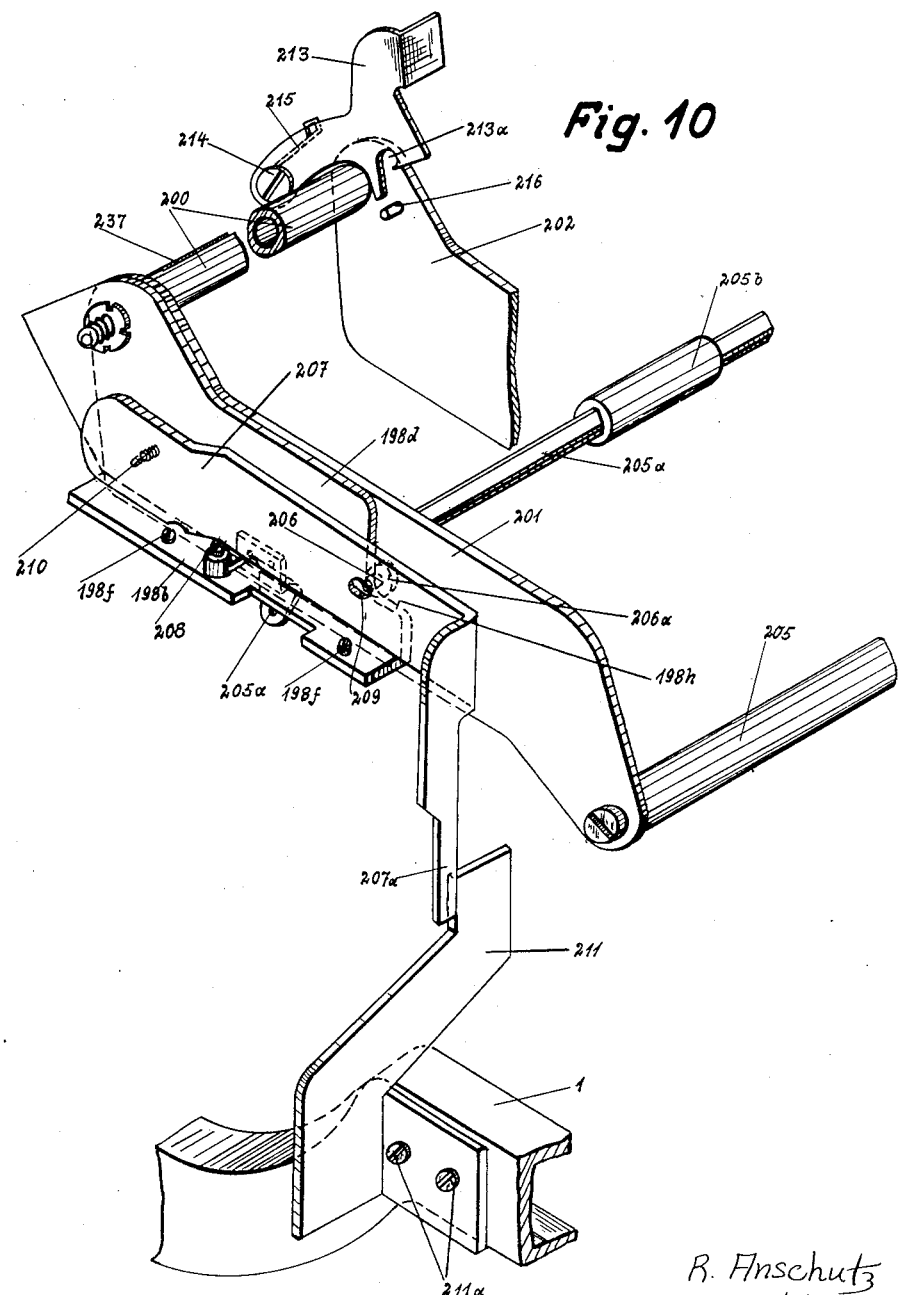
Figure 10 shows a perspective representation of a detail of the totalizer carriage, viewed from the front left-hand side of the machine.

In the side-wall, 201, (Figure 1) of the upwardly swingable frame, 201—205—202, a pin, 206, is fixed (Figures 2, 3, and 10). So far as the carriage, 4, is not in its extreme right-hand position, the pin, 206, is capable of entering into a hole 209, in a lever, 207, which is swingably mounted by means of a screw, 208, on the horizontal part 198b, of the left-hand side wall, 198d, and is held in contact with the side wall, 201, of the frame 201—205—202, by means of a spring, 210. In consequence of this, an upward swinging movement of the frame, 201—205—202, usually is not possible. If, however, the carriage, 4, is in its extreme right-hand position, then the downwardly projecting end 207a, of the lever, 207, contacts with a stop, 211, fixed by means of the screws, 211a, (Figure 10) on the left-hand frame wall of the frame 1, whereby the lever, 207, is swung in the clockwise direction and consequently the hole, 209, in the same releases the pin, 206, of the frame, 201—205—202, so that the frame, as is indicated by dotted lines in Figure 5, can be swung upwards.

The left hand and right hand side walls, 201, 202, of the frame, 201—205—202, are further connected by a square rod, 205a, (Figures 2 and 10) on which a number of paper pressure rollers, 205b, (Figures 2, 4, 5, and 10) are rotatably and displaceably mounted. These rollers in combination with the usual paper guide rollers, 205d, (Figures 2 and 4), which are only provided at the sides, hold and guide the day-book sheet, S, on the platen, 4a.

In order to provide additional guides for the day-book sheet, S, and to support the square rod, 205a, the latter is connected with the hollow shaft, 200, by bent connecting tongues, 205c, (Figures 2 and 4).

In the right hand side wall, 202, of the frame, 201—205—202, is fixed a pin, 212, (Figure 2), which has the same diameter as the thickened part, 206a, (Figure 10), of the pin, 206. By means of the pins, 212 and 206a, the frame 201—205—202, rests under its own weight in recesses of the fixed side walls, 198d and 198e. One of these recesses, namely, that in the left-hand side wall, 198d, is evident from Figure 10 and is indicated by, 198h. The working position of the frame 201—205—202, determined by the pins, 206a, and 212, as already mentioned above, is secured by the entering of the pin, 206, into the hole, 209, in so far as the main carriage, 4, is not in its extreme right hand position illustrated in Figure 2.

In order to hold the frame, 201—205—202, in its upwardly swung position, there is a pin, 216, (Figures 2 and 10) fixed in the right hand side wall, 202, which pin in the upwardly swung position of the frame 201—205—202, enters into a corresponding recess, 213a, of a lever, 213, (Figures 5 and 10.) The lever, 213, is rotatably mounted by means of a screw, 214, on the right hand side wall, 198e, of the frame, 201—205—202, and by means of a spring, 215, is normally pressed against the hollow shaft, 200.

The lever, 213, therefore, retains the whole frame, 201—205—202, in its upwardly swung position. On the shafts, 200 and 205, (Figure 4) of the frame, 201—205—202, the paper carriage, 197, (Figures 1 and 2) is displaceably mounted. This carriage consists of two side walls, 217 and 218, (Figures 2, 7, 8, and 9) which have U-shaped parts, 219 and 220, in front, embracing the shaft, 205. In the U-shaped parts, 219 and 220, rollers, 223 and 224, are rotatably mounted by means of the screws, 221 and 222, the rollers running on the shaft, 205. The U-shaped parts, 219 and 220 thus prevent lifting of the carriage, 197, from the shaft, 205. The side walls, 217 and 218, are interconnected with one another by a bridge, 225, (Figure 2) which for this purpose has right-angled forwardly bent lugs, 226 and 227, on both of its ends and which is fixed to the side walls, 217 and 218 by rivets, 227a, (Figures 4, 5, 8, and 9.) In order to increase the rigidity of the carriage, 197, the rear bridge, 225, has its upper edge bent rearwards at right angles. In the centre of the bridge, 225, there is bent a lug to form a U-shaped part, 228, (Figure 4), a roller, 229, is rotatably mounted in the part, 228, by means of a screw, 230, the roller, 229, running on the shaft, 200, (Figures 2 and 4). The carriage, 197, runs, therefore, on the two front rollers, 223 and 224, and on the rear roller, 229. An angle piece, 232, fixed to the bridge, 225, (Figure 4) by screws, 231, has a right-angled bent part, 233, which engages the underside of the shaft, 200, whereby lifting up of the carriage, 197, is likewise avoided. A limb, 234, (Figures 1, 2, 7, and 8) which projects towards the left, is fixed to the bridge 225, by screws, 236. The limb, 234, projects into a slot, 237, (Figures 1, 7, and 8) formed in the hollow shaft, 200. In the hollow shaft, 200, is provided a long tension spring, 238, which at the right is attached to the pin, 239, (Figures 1 and 2) and at the left is attached to a hole, 235, (Figures 7 and 8) provided in the limb, 234. The tension spring, 235, consequently acts on the carriage, 197, always in the direction of the arrow "a" (Figure 2).

In order to hold the carriage, 197, against the action of the spring, 238, the following device is provided. On the inner side of the left-hand side wall, 217, (Figure 8) there is a member, 241, (Figures 2, 3, 5, and 8) which is pivotably mounted by means of a screw, 240. The member, 241, is provided with an elongated hole, 242, the longitudinal sides of the hole being formed as arcs of circles struck from the screw, 240. By means of a spring, 256, which is connected to the part, 241, itself, and to a pin, 255, on the left-hand side wall, 217, the part, 241, is acted on in the clockwise direction. This swinging movement is limited by the screw, 243, which projects through the elongated hole, 242, the screw, 243, being fixed in the right angled bent lug, 248, of the U-shaped part, 219. On the part, 241, further, an angle, 249, is fixed, on which a pawl, 251, is swingably mounted by means of a screw, 250. The pawl, 251, is acted on in the anticlockwise direction by a spring, 253, attached at one side to a pin, 252, of the pawl, and at the other side to a pin, 254, of the angle, 249. The rest position of the pawl, 251, is determined by the contact of its nose, 260, with the wall of the angle, 249, in which position, nevertheless, the pawl, 251, takes up its working position in relation to the notches, 259a, 259b, 259c, and 259d. On the shaft, 205, a number of notches, 257, 257a, 257b, 257c, 257d, 259a, 259b, 259c, and 259d are provided (Figures 2, 7, and 8). As is represented in Figure 8, the part, 241 is located in one of the notches, 257, whereby the paper carriage, 197, is held in its position against the pull of the spring, 238. The forwardly projecting limb, 244, of the part, 241, lies in the path of movement of raised portions, 244b to 244e, provided on a bar, 244a, which raised portions are arranged opposite each notch, 257, in the shaft, 205. The bar, 244a, is provided with a grip, 244f, and is slidably mounted on the forward bridge, 4d, of the main carriage, 4, by means of a number of screw-slot connections, 244g, 244h. The bar, 244a, is held in its left-hand position, which is determined by the screw-slot connections, 244g, 244h, by means of a spring, 244k, which at one end is connected to a pin, 244i, of the bar 244a, and at its other end to a pin, 244j, of the front bridge, 4d. The bar, 244a, on its left-hand end, has an upwardly directed extension, 244m, (Figure 2), which lies in the path of movement of the line-shift lever, 113, so that the bar, 244a, can be moved towards the right by the hand grip, 244f, and also by the line shift lever, 113.

The part, 241, has further, a downwardly projecting limb, 245, which lies in the path of movement of an angle, 246, fixed by screws, 247, to the running rail, 3, of the frame, 1. On the left-hand side wall, 217, of the carriage, 197, is further, a lever, 262, which is provided with a roller, 261, (Figure 8), and which is swingably mounted by means of a screw, 263. Between a pin, 264 (Figure 8), fixed in the side wall, 217, and the free end of the lever, 262, there extends a tension spring, 265, which presses the roller, 261, on to a star wheel, 266, and consequently locks this in its position for the time being. This star wheel is pinned to a shaft, 267, (Figures 7 and 8) which projects through the left-hand side wall, 217, and is rotatably mounted therein. This shaft is rotatably mounted at its right hand end in the right hand side wall, 218, and carries the paper guide rollers, 267a, (Figures 7, 8, and 9). The rollers, 267a, project through apertures, 267b, (Figure 6), in the paper guide plate, 267c, fixed between the side walls, 217 and 218. For laterally guiding the sheet, R, the usual paper layers 267c', are slidably arranged on the paper guide plate, 267c. Levers, 267e, are mounted on screws, 267d, (Figures 6 and 7) fastened in the left-hand and right-hand side walls, 217 and 218, so as to be capable of swinging around these screws, the levers at their upper free ends being inter-connected with one another by a rod, 267f. At the centre of both levers, 267e, there is a shaft, 267g, which is rotatably mounted therein, and on this shaft, paper guide rollers, 267h, are fixed. By means of the torsion springs, 267i, coiled round the screws, 267d, the yoke, 267e—267f—267e, is so acted upon that its paper guide rollers, 267h, are pressed against the already mentioned paper guide rollers, 267a. Between the rearwardly projecting ends, 267j, of the levers, 267e, there is a tensioned wire, 267k, which acts as a line indicator for the sheets to be adjusted.

On the right-hand side wall, 218, of the carriage, 197, a slide, 268, (Figures 4 and 9) is slidably mounted by means of screws, 269, which project through elongated holes, 270. The slide, 268, in addition, is guided by a slot, 273, in the bent-round part, 220, of the right-hand side wall, 218. With the rear end of the slide 268, engages a spring, 271, which is also connected to a pin, 272, on the right-hand side wall, 218. By means of the spring, 271, on the one hand and the screw-slot guides 269, 270, on the other hand, the rest position of the slide, 268, is determined. A pawl, 275, is pivotably mounted on a screw, 274, of the slide, 268, and is acted on in the clockwise direction by a torsion spring, 276, the swinging movements of the pawl being limited by a pin, 277. The lower limb of the pawl, 275, lies in the zone of a shift-wheel, 278, which, together with a toothed wheel, 279, (Figures 4 and 9) is pinned on the shaft, 267. The upper arm, 275a, of the lever, 275, is capable of co-acting with a pin, 275b, (Figure 4) of a toothed segment, 280, provided with a hand or throw-in lever, 280a. This toothed segment engages with the toothed wheel, 279, and is pivotably mounted by means of a screw, 281, on the right-hand side wall, 218. The swinging movement of this segment is limited in both directions by a pin 282. The slide, 268, (Figure 9) has, on its front end, a right-angled lug, 283, bent to the left. On this lug, there is an angle plate, 285, which is pivotably mounted by means of a screw, 284, and which is provided with a rotatable roller, 286. By means of this roller, the angle plate, 285, co-acts with an angle piece, 288, (Figure 9) attached by screws, 287, to the running rail, 3, of the frame, 1.

In order to limit the stroke of the angle-plate, 285, there are two stops, 289 and 290, provided, which are bent on the bent-round lug, 283, of the slide, 268.

Further, in order to limit the movement of the carriage, 197, to the right, a stop, 294, (Figure 2) is attached to the running rail, 3, of the frame, 1.

The operation of the invention will now be explained with the aid of a sample calculation. As will be evident from a comparison of the Figures 11 and 12, the four columns of the invoice sheet R, (Figure 12) lying one beneath the other are to be typed through side by side on a day-book sheet S.

In order, however, to be able to insert the day-book sheet S, (Figure 11) in the machine, it is necessary to move the main carriage, 4, wholly to the right. This is effected, in case the displacement of the carriage to the right has not been automatically executed already by the right-hand margin setter, Rr, in a known manner by the depression of the carriage return key, 293, (Figure 2). By this means, the carriage return coupling, 28, 27 (Figure 1), is closed by a known arrangement of lever mechanism (not shown), and the rack, 16, mounted on the main carriage, 4, is first of all displaced in the direction of the arrow "a" through the parts, 26, 25, 24, 22, 21, 20, 18, and 17 (Figures 1 and 3), in order to perform the movement necessary for swinging the line shift lever, 113, (Figure 2), whereby the line shift lever, 113, (seen in Figure 2), is swung in the anti-clockwise direction and the platen, 4a, according to the setting of the line-shift device, is shifted forward one to three lines. Now, let it be assumed, that the carriage, 197, is located already in its extreme right-hand position, in which therefore, its part, 220 contacts with the stop, 294, (Figure 2), while the main carriage, 4, is located in a position further to the left than that shown in Figure 2, e. g., so far to the left that the pawls, 241 and 251, (Figures 2 and 8) rest in the notches, 257a, and 259a, of the rod 205. In this case, the main carriage, 4, could not be moved further to the right, without special precautions by the pawls, 241 and 251, located in the notches, 257a and 259a on the one side and by the contact of the part, 220, of the carriage, 197, with the stop, 294, on the other side preventing a further movement of the main carriage, 4, towards the right and consequently injury to the machine could arise if at this point of time the return coupling, 27, 28, (Figure 1), was not yet opened by the left hand margin setter, Rx.

In order, however, to render possible a further movement of the main carriage, 4, towards the right, the line shift lever, 113, in its swinging movement acts on the nose, 244m, of the bar, 244a, and displaces it in the direction of the arrow "a" (Figure 8). The raised portion 244b, of the bar 244a, thereby acts on the pawl, 241, 244, and raises this as well as the pawl, 251, mounted on it, out of their notches, 257a, and 259a, whereby the main carriage, 4, can now move into its extreme right-hand position as represented in Figure 2, and the left-hand margin setter, Rx, opens the carriage return coupling 27, 28, (Figure 1). Obviously, the same operation would take place if the pawl, 241, and 251, were located in the notches, 259b and 257b, (Figures 2 and 8). When the main carriage, 4, runs into its extreme right-hand position, the parts take up their position as shown in Figure 2, in which also, as already mentioned, the lever, 207, (Figure 10) through the striking of its downwardly extending projection, 207a, against the stop, 211, releases the pin, 206, of the frame, 201—205—202, whereby the frame, 201—205—202, is unlocked.

After this is effected, the frame, 201—205—202, is gripped by the rod, 205, and swung—upwards into the position indicated by dotted lines in Figure 5, in which it is held by the engagement of the pin, 216, with the locking lever, 213. As the carriage, 197, runs in the frame, 201—205—202, it is also swung upwards along with the frame, in which position it is held against the action of the spring, 238, by the previous engagement of the pawl, 241, 244, with its notch, 257. For this reason, the bar, 244a, in this position, exhibits no projection for raising the pawl, 241.

Free access to the platen, 4a, from the front is obtained in this position, so that the day-book sheet, S, can be introduced and adjusted.

Over the column totalizers, a scale, 296, (Figure 3) is arranged and corresponds accurately to the blank form of the day-book sheet, S, (Figure 11). On inserting the day-book sheet, S, it is set according to the columns indicated on the scale, 296, or according to the paper layers, 203a (Figure 4) set according to these columns. The day-book sheet, S, is now inserted by positioning it on the paper leading-in plate, 203, in the usual manner, and by rotation of the platen, 4a, whereby the upper end of the day-book sheet, S, rests on the platen, 4a. The sub-columns of each main column (Gas, Water, etc.) are indicated by the reference "1" to "5". They now stand accurately opposite to their associated column totalizers. After the day-book sheet is inserted the lever, 213, is pressed back and the frame, 201—205—202, together with the paper carriage, 197, lowered into its normal position. In this position, the pressure rollers, 205b, provided on the frame, 201—205—202, rest against the platen, 4a, whereby the day-book sheet, S, is held on the platen, 4a, in the position illustrated in Figure 4, and the tongues, 205c, divert the upper edge of the day-book sheet, S, against the paper leading-in plate, 203.

Now, by rotating the platen, 4a, the day-book sheet, S, is adjusted in relation to the adjusting wire, 267k, so that the first typing line, "I" (Figure 11) of the sheet is in the typing position in which, if necessary, the lower lateral pressure rollers, 205d, can be lowered in order that the typing line of the day-book sheet, S, also can be adjusted so as to be parallel to the adjusting wire, 267k, by slightly raising the frame, 201—205—202. After this is effected, the lower paper guide rollers, 205d, are raised again, so that they rest on the platen, 4a. Before the invoice sheet, R, (Figure 12) is inserted in front, the toothed segment, 280, must be swung in the direction of the arrow "x" shown in Figure 4, until it strikes against the pin, 282.

The invoice sheet consists of the usual invoice sheet, R, (Figure 13) and a receipt sheet, Q, similar to the invoice sheet, which receipt sheet is connected with the invoice sheet by perforations "y" and is folded along the line of perforations. In the receipt-invoice sheet, Q. R., thus folded, a carbon paper, K, folded at Z, is inserted from beneath, which is only carbonized at the positions and sides indicated by thick lines, K1 and K2, in Figure 13 of the carbon paper sheet for the purpose of copying.

The invoice-receipt sheet, R. Q., thus provided with carbon paper, is now led downwards in the direction of the arrow in Figure 4, along the paper guide plate, 267c, in which it is guided laterally by the formerly set paper layers, 267c', and is led in with its lower edge into the cleft formed by the paper guide rollers, 267a and 267h. The toothed segment, 280, is now swung again in the opposite direction to that of the arrow "x" into the position illustrated in Fig. 4. The toothed wheel, 279, (Figures 4 and 9) meshing with the toothed segment, 280, is thereby rotated in the opposite direction to that of the arrow "f", whereby the paper guide rollers, 267a, are also rotated in the opposite direction to that indicated by the arrow "f" and in conjunction with the pressure rollers, 267h, move the invoice-receipt sheet, R. Q., with the carbon paper, K, as shown in Figure 4, downwards between the platen, 4a, and the feeding plate, 4c, arranged on the frame, and lead them between the platen, 4a, and the paper guide plate, 4b. The paper guide plate, 4b, projects into the zone of the column to be typed not penetrated by the paper guide rollers, 205d, so that the invoice-receipt sheet, R. Q., can move freely between the platen, 4a, or the day-book sheet, S, and the paper guide plate, 4b. The adjustment of the invoice-receipt sheet, according to the adjustment wire, 267k, is effected on slightly retracting the pressure roller yoke, 267e—267f—267e, (Figure 6) and, of course, in such a manner that the typing line indicated with I in Figure 12, is located in the typing position, in addition to which, the name column indicated by "0" of the invoice sheet is also exactly opposite the name column of the day-book sheet indicated by "0" and the lines indicated by I are in register.

The address "Schmidt, Ernest Gera, Markstr. 5" is first of all typed by striking the letter keys, ST, (Figure 2). As formerly, in the right-hand position of the carriage 4, the pawl, 241, is engaged with the notch, 257, of the shaft, 205, so that the carriage, 197, during the typing of the address, participates in the movement towards the left of the carriage 4. In the extreme right-hand position of the carriage, 4, in which the paper carriage, 197, is in the position illustrated in Figure 2, no notch is necessary for the pawl, 251. After the address is typed, both carriages, 4 and 197, have moved so far to the left that the downwardly projecting limb, 245, of the pawl, 241, (Figure 8) on the paper carriage, 197, is raised by the angle, 246, which lies in its path of movement, and the pawl, 241, is moved out of engagement with the notch, 257. Consequently, the paper carriage, 197, is moved under the action of its spring, 238, to the right in the direction of the arrow "a" (Figures 1 and 2), up to the next notch, 257a, within the main carriage, 4, which is stationary, and again rests there. Also, the pawl, 251, rests in the notch, 259a, under the action of its spring, 253, and thus prevents the possibility of the paper carriage springing back.

The "Gas columns", "1" to "5" of the invoice-receipt sheet, R. Q. thus stand opposite to the "Gas columns", "1" to "5" of the day-book sheet, S.

Shortly before the paper carriage, 197, comes to rest, the roller, 286, (Figures 4 and 9) slides along on the incline, 288a, of the stationary angle piece, 288. By reason of the bent lug, 289, of the part, 283, acting as a stop for the roller lever, 285, the roller, 286, and therewith, the slide, 266, are displaced rearwards by the incline, 288a, whereby the lower limb of the lever, 275, rotates the shift wheel, 278, through one tooth. The guide rollers, 267a and 267h, are rotated in the direction of the arrows "f" and "f1" (Figure 9) by means of the shift-wheel 278, pinned on the shaft, 267, whereby the invoice-receipt sheet, R. Q., in the carriage, 197, is shifted upwards by one typing line, i. e. from line I to line II. Consequently, the line II of the invoice-receipt sheet R. Q. is opposite to the line I of the Main Gas column of the day-book sheet S. As soon as the roller, 286, is released by the angle piece, 288, the slide, 268, immediately slides forward again under the action of the spring, 271. This sliding movement is limited by the co-operation of the elongated holes, 270, with the screws, 269.

The following table gives a survey of the necessary column totalizers and the operative setting of the cross totalizers 111 and 112, for filling in the forms shown in Figures 11 and 12, the control plates, Aa, Ab, of the column totalizers being previously set for determining the type of calculation to be performed by the cross totalizers:— effected, of course, by striking the typing number keys, Stl. (Figure 2.)

| Typing line | Col. | No. colmn. totlr. | Reading colmn. totlr. | Type of calcn. cross totlr. 111 | Type of calcn. cross totlr. 112 | Reading cross totlr. 111 | Reading cross totlr. 112 | Clear sign from cross totlr. |
|---|---|---|---|---|---|---|---|---|
| 1 | 2 | 3 | 4 | 5 | 6 | 7 | 8 | 9 |
| Name I | | | | | | | | |
| II | 1 | 71 | Blank totlr. | A | U | 380 | Zero | |
| | 2 | 72 | Blank totlr. | S | U | −350 =30 | Zero | |
| | 3 | 73 | 30 | S | U | Zero | Zero | 111 |
| | 4 | 74 | 3.00 | U | A | Zero | 3.00 | |
| | 5 | 75 | 0.50 | U | A | Zero | +0.50 =3.50 | |
| III | 1 | 76 | Blank totlr. | A | U | 650 | 3.50 | |
| | 2 | 77 | Blank totlr. | S | U | −590 =60 | 3.50 | |
| | 3 | 78 | 60 | S | U | Zero | 3.50 | 111 |
| | 4 | 79 | 1.20 | U | A | Zero | +1.20 =4.70 | |
| | 5 | 80 | 0.25 | U | A | Zero | +0.25 =4.95 | |
| IV | 1 | 81 | Blank totlr. | A | U | 627 | 4.95 | |
| | 2 | 82 | Blank totlr. | S | U | −610 =17 | 4.95 | |
| | 3 | 83 | 17 | S | U | Zero | 4.95 | 111 |
| | 4 | 84 | 5.95 | U | A | Zero | +5.95 =10.90 | |
| | 5 | 85 | 0.50 | U | A | Zero | +0.50 =11.40 | |
| V | 1 | 86 | Blank totlr. | A | U | 697 | 11.40 | |
| | 2 | 87 | Blank totlr. | S | U | −236 =461 | 11.40 | 111 |
| | 3 | 88 | 461 | S | U | Zero | 11.40 | 111 |
| | 4 | 89 | 55.32 | U | A | Zero | +55.32 =66.72 | |
| | 5 | 90 | 1.00 | U | A | Zero | +1.00 =67.72 | |
| | 6 | 91 | 3.00 | U | A | Zero | +3.00 =70.72 | |
| | 7 | 92 | 2.00 | U | A | Zero | +2.00 =72.72 | |
| | 8 | 93 | 15.00 | U | A | Zero | +15.00 =87.72 | |
| | 9 | 94 | 87.72 | U | S | Zero | Zero | 112 |

This table enables the example of calculation selected for demonstrating subsequent operations to be more readily understood.

As the setting of the control plates, Aa, Ab, of the individual column totalizers, 71 to 94, for the type of calculation of the cross totalizers, 111, and 112, is obvious from the foregoing table, so in the following description, this will not be entered into in detail.

It may be mentioned, however, that of the totalizers, 71 to 94, arranged on the carrying rail, T, the totalizers, 73 to 75, 78 to 80, 83 to 85, and 88 to 94, are complete totalizers, while the totalizers, 71 and 72, 76 and 77, 81 and 82, 86 and 87, are blank totalizers. The blank totalizers which, as known, consist only of the totalizer housings which lack all the internal mechanism such as transfer wheels, numeral wheels and so forth, serve solely for the control of the cross totalizers, 111 and 112, for addition, uncoupled—and subtraction.

After the control plates, Aa, Ab, of all the totalizers, 71 to 94, have been set according to the table, and while, as already mentioned, the invoice-receipt sheet R. Q. has its line II lying opposite to the line I of the main "Gas" column of the day-book sheet, S, the space "Consumption up to" is filled in with the date 31,10,12. This is As before, namely, after the address had been typed, the paper carriage, 197, is held in position by engagement of the parts, 241, 244, and of the pawl 251, in the notches, 257a and 259a, this carriage on typing the date participates in the movement to the left of the carriage, 4. Thus the sheets, after the typing of the date has been effected, move into the column indicated by "1" of the main "Gas" column.

By means of the calculating keys, 41, the "last counter reading" to be indicated is impressed on the sheets. As the control plate, Ab, for the cross totalizer, 111, on the blank mechanism, 71, is set on "addition" the value "380" is registered additively in the cross totalizer, 111. There appears, consequently, in the cross totalizer, 111, the value "380", which is also typed in the column "1".

In the movement towards the left of the carriage, the cross totalizers, 111 and 112, as already hereinbefore described, have been carried along by the coupling rods of the blank column totalizer and in the typing of the last number "0", are disconnected from the blank column totalizer, 71 and connected to the blank column totalizer, 72.

As the "last but one counter reading 350" to be indicated in the column "2" must be deducted from the last "counter reading 380" in the cross totalizer, 111, so the blank column totalizer, 72, is set on subtraction.

On striking the calculating keys, 41, corresponding to the value "350", this value is typed on the sheets in the column indicated by "2". As the control plate, Ab, of the blank column totalizer, 72, stands at "subtraction", so the cross totalizer, 111, is acted on in the negative sense. Consequently, the value "30" appears in the inspection aperture of the cross totalizer, 111. This is the difference of the two counter readings in columns 1 and 2. The total gas consumption for the month amounts therefore to 30 cbm.

As soon as the carriages, 4 and 197, move along with the last x calculating place out of the working position of the machine, the cross totalizers, 111 and 112, spring back again to the right and are connected to the next column totalizer, 73.

The "cbm consumption" indicated in the cross totalizer, 111, is now written out of the same and registered in the column totalizer, 73.

The column totalizer, 73, for this reason is set on "subtraction".

By striking the corresponding calculating keys, 41, value "30" in the cross totalizer, 111, is registered in the column totalizer 73 and typed on the sheets in the column indicated by "3". If the value "30" is correctly written out of the cross totalizer, 111, then in the manner already described, the "clear sign" star appears after the value "30".

Simultaneously, the cross totalizers, 111 and 112, are disconnected from the column totalizer, 73, whereby they spring back into their right-hand position so that in the following movement of the carriage, 4, to the left, they will be taken along with the column totalizer, 74.

The tabulator key, Tl, (Figure 3) is now depressed whereby the carriage, 4, as well as the paper carriage, 197, move into the units decimal place of the column indicated by "4".

Then, the calculating keys, corresponding to the amount of R. M. "3,00" are depressed, whereby in the column totalizer, 74, the amount "3,00" appears and as the control plate, Aa, for the cross totalizer, 112, stands at "addition", the amount "3,00" is registered in the latter totalizer and appears in the inspection aperture. The typing of the amount R. M. "3,00" on the sheets is likewise effected in the column indicated by "4" of the main "Gas" column.

After the amount "3,00" has been registered in the column totalizer, 74, and the cross totalizer, 112, the cross totalizers, 111 and 112, are again disconnected and are connected to the column totalizer, 75.

In order to register in the column "5" of the main "Gas" column the regulation or loaning fee of R. M. "0,50" for the counter, the tabulator key Ta 6. (Figure 2) is first depressed, whereby the carriage 4, and the paper carriage, 197, move into the pfennigs "tens" place.

The calculating keys, 41, corresponding to the amount, "0,50" are depressed, whereby the amount "0,50" is registered in the column-totalizer, 75, and typed on the sheets. As the control plate, Aa, for the cross totalizer, 112, is set at "addition", so the amount of "0,50" is added to the amount of R. M. "3,00" already registered in the cross totalizer, 112, whereby the amount of R. M. "3,50" is visible in the inspection aperture.

On the typing of the last "0" in the pfennigs unit place, the cross totalizers, 111 and 112, are disconnected from the column totalizer, 75, and connected to the blank column totalizer, 76.

Simultaneously, on the carriage step following immediately on the striking of the key of the last "0", the downwardly projecting limb, 245, (Figure 8) of the part, 241, of the paper carriage, 197, is raised by the incline of the angle, 246, and the part, 241, 244, together with the pawl, 251, are lifted out of the notches, 257a and 259a, of the shaft, 205, whereby the paper carriage, 197, springs forward within the carriage, 4, in the direction of the arrow "a" (Figure 1) under the action of its spring, 238, as far as the next notches, 257b and 259b, and rests there.

Shortly before the paper carriage, 197, stops, the roller, 286, (Figure 9) slides along the incline, 288a, of the angle piece, 288. The slide, 268, thus slides to the rear, whereby the lower limb of the pawl, 275, rotates the shift-wheel, 278, through the distance of one tooth and shifts the invoice-receipt sheet, R. Q. in the paper carriage further through the distance of one typing line. This sheet is thus shifted forward from the typing line II to the typing line III, so that the typing line III of the invoice-receipt sheet is located over the line I of the main "Water" column of the day-book sheet, S.

Now the same calculating processes are repeated in the columns, "1" to "5" of the main "Water" column as in the main "Gas" column. After the calculation of the amount "0,25" in the column "5" of the main "Water" column, the cross totalizer, 112, shows the total of all the marks and pfennigs amounts calculated up to that point as "4,95." Similarly, the column totalizer, 79, shows the amount of "1,20" and the column totalizer, 80, the amount of "0,25."

On typing the last "5" in the pfennigs units place, in the column "5", the cross totalizers, 111 and 112, are again disconnected and are connected to the blank column totalizer, 81. As in the main "Gas" column, simultaneously with the carriage step which follows immediately on striking of the key of the last "5", the downwardly projecting limb, 245, is raised from the angle, 246. The parts, 241, 244, together with the pawl, 251, are again disengaged from the notches, 257b and 259b, whereby the paper carriage, 197, under the action of its spring, 238, springs forward in the direction of the arrow "a" and comes to rest in the next notches, 257c and 259c, of the shaft, 205.

Shortly before the paper carriage, 197, comes to rest, the roller, 286, slides again along the incline, 288a, of the part 288, and the slide, 268, moves rearwards whereby the lever, 275, rotates the shift-wheel, 278, through the distance of one tooth and the invoice-receipt sheet R. Q. is shifted by means of the guide rollers, 267a and 267h, from the typing line III to the typing line IV. By the movement of the paper carriage, 197, up to the next notches, 257c and 259c, in the shaft, 205, and by the shifting of the invoice-receipt sheet, R. Q. into the typing line, IV, the line IV of the invoice-receipt sheet lies on the line I of the main "Light current" column of the day-book sheet, S. The calculating process is again exactly the same as in the foregoing main columns. After the difference between the two counter readings in the columns "1" and "2" is determined in the cross totalizer, 111, and the "KW" consumption has been written out of the cross totalizer 111, and has been registered in the column totalizer, 83, by means of the calculating keys, the "clear sign" star appears, after the impression in column "3", as in the foregoing main columns. The amounts in the columns "4" and "5" are added in the cross totalizer, 112, whereby the same shows the total amounts from the "Gas", "Water", and "Light current" main columns, viz: R. M. "11,40" (see table). The amounts R. M. "5,95" and R. M. "0,50" are naturally registered in the column totalizers, 84 and 85, and typed on the paper.

Simultaneously, the cross totalizers, 111 and 112, are uncoupled from the column totalizer, 85, and spring back into their right-hand position so that in the subsequent movement of the carriage, 4, to the left, they will be taken along with the column totalizer, 86.

Further, by the carriage step which arises on typing the last "0" in the pfennigs units place in the column "5" and in consequence of the part, 245, of the pawl, 241, running off the incline of the angle, 246, the pawl, 241, and the pawl, 251, are raised out of the notches, 257c and 259c, whereby the paper carriage, 197, springs forward under the action of its spring, 238, in the direction of the arrow "a", and comes to rest in the next notches, 257d and 259d, of the shaft, 205, and simultaneously with its U-shaped part, 220, contacts with a pin, 205x, fixed on the shaft, 205.

In this movement towards the right, the roller, 286, again runs on the incline, 288a, whereby the slide, 268, is pressed rearwards, and the shift-wheel, 278, is again rotated through the distance of one tooth. The invoice-receipt sheet, R. Q. has thus been shifted forward to the line indicated by V on it, so that now the line V of the same covers the line I of the main "Power current" column of the day-book sheet, S.

The calculating process which took place in the foregoing columns is now repeated. The "clear sign" star consequently appears in the column "3" after the impression of the "Kw. consumption" which has been written out of the cross totalizer, 111, and registered in the column totalizer, 88. The amounts in the columns "4" and "5" are again added in the cross totalizer, 112, which now shows the total of the four main columns, viz. R. M. "67,72" (see table). Moreover, the column totalizer, 89, obviously shows the amount "55,32", and the column totalizer, 90, the amount "1,00", in addition to which these amounts have also been typed. On the typing of the last "0" in the pfennigs units place, the parts, 241, 244, are again raised by the part, 246. The paper carriage, 197, cannot, however, be moved further to the right, as the part, 220, as already mentioned, contacts with the pin, 205x, of the shaft, 205, also no forward shifting of the invoice-receipt sheet takes place. This is not allowed to take place at this point, as the columns "6" to "9" following thereon, which are to be filled in one the typing line I of the day-book sheet, S, inserted in the main carriage, 4, and on the typing line V of the invoice-receipt sheet located in the paper carriage, 197, lie behind the main "Power current" column.

The tabulator key, Tl, is now depressed whereby the main carriage, 4, and also the paper carriage, 197, move into the units decimal place of the column indicated by "6".

Then, the calculating keys corresponding to the amount of R. M. "3,00" are depressed whereby in the column totalizer, 91, the amount "3,00" appears and as the control plate for the cross totalizer, 112, stands at "addition", so the amount "3,00" is also registered in this cross totalizer, which now shows the total amount of "70,72" (see table).

The typing of the amount R. M. "3,00" likewise is effected on the sheets in the column indicated by "1".

In the typing of the last "0" in the pfennigs units place, the cross totalizers, 111 and 112, are again disconnected and are coupled up to the column totalizer, 92.

By depression of the tabulator key, T, the carriage is now caused to spring into the correct decimal place of the next column and the amount of R. M. "2,00" is now registered in the column totalizer, 92, and is typed in the column indicated by "7". The amount, "2,00" is added as before, in the cross totalizer, 112, which now shows a total sum of R. M. "72,72".

On typing the last "0" in the pfennigs units place, the cross totalizers, 111 and 112, are again uncoupled and are connected to the column totalizer, 93.

By depressing the tabulator key, Tl, both carriages are caused to spring again into the tens decimal place of the column "8", and the outstanding instalment payment of R. M. "15,00" is registered, which amount is typed in the column "8" of the sheets and is registered in the column totalizer, 93, and further is added to the amount in the cross totalizer, 112. This shows, therefore, the total amount of R. M. "87,72" (see table).

This amount is now written out of the cross totalizer, 112, by means of the corresponding calculating keys, and moreover registered in the column totalizer, 94, and impressed on the paper in the column "9". If the amount is correctly written out of the cross totalizer, 112, then behind the amount "87,72" appears the "clear sign" indication.

By the carriage step released on the impression of the last clear sign, the margin setter Rr which is arranged close to the side of the column totalizer, 94, now acts on the control rods (not shown) of the carriage return coupling 27 and 28, whereby this is closed and the carriages, 4 and 197, are moved to the right. The lever, 113, is now pressed into the right-hand position by the carriage return and a line shift of the platen, 4a, results, whereby the day-book sheet S, on the platen, in the main carriage, 4, is shifted forward to the next typing line II. The line shift lever, 113, acts, moreover, in its right-hand position, at the same time on the nose, 244m, of the bar, 244a, and holds it in the right-hand position in order to lift the pawls, 241 and 251, by means of the raised portions 244b, 244c, 244d and 244e, as before described.

The main carriage, 4, and the paper carriage, 197, move together to the right until the latter is held by the stop, 294. As the pawls, 241 and 251, are, however, raised by the raised portions, 244b, to 244e, the main carriage, 4, is capable of moving further to the right, independently of the carriage, 197. The flat portions, 258, on the shaft, 205, act, moreover, to ensure the part, 241, being lifted out.

On the arrival of the main carriage, 4, into its extreme right-hand position, the left-hand margin setter, Rx, acts then again on the control rods of the carriage return coupling, 27, 28, whereby the coupling is opened, and the carriage, 4, comes to rest. The carriages, 4 and 197, then take up again their normal position as illustrated in Figure 2.

The shaft, 205, is arranged so as to be readily exchangeable and may be replaced by another shaft, on which the notches, 257 to 257d, and, 259a to 259d, are arranged at other distances, so that the device can be readily adapted to any sheet.

It may be further remarked that the machine at any time may be used as a normally working typewriter without the necessity of removing the upper carriage, 197. To this end, the angle piece, 246, as shown in Figure 8, in consequence of the elongated slots, 247a, can be lowered, so that it does not operate on the part, 245, and the pawls, 241 and 251, therefore, are not lifted out, so that the carriage, 197, remains in its left-hand position. The arrangement for setting the angle piece, 246, may obviously be so arranged, that it may readily be brought into and out of its working position.

The purpose of the nose, 275a, arranged on the pawl, 275, (Figure 9) is as follows: When the toothed segment, 280, has rotated completely in the direction of the arrow "x" (Figure 4), its movement in this rotational direction is limited by the pin, 282. If in this case, an action of the angle piece, 288, on the roller, 286, and therefore on the slide, 268, has taken place, then the latter could no longer be displaced, as the pawl, 275, is no longer capable of rotating the shift wheel, 278, in consequence of the toothed segment, 280, contacting with the pin, 282. Damage could therefore take place. In order to avoid this the nose, 275a, is provided, with which the pin, 275b, arranged on the toothed segment, 280, contacts, and raises the pawl, 275, out of the shift wheel, 278.

I claim:—

1. A typewriting-calculating machine, typewriting machine or the like having in combination, a main carriage, a sheet-carrying carriage adapted to be displaceable in common with or independently of said main carriage, said sheet-carrying carriage, including a swingable frame, together with means for locking said swingable frame, said locking means being unlocked in one position only by the movement of said main carriage.

2. A typewriting-calculating machine, typewriting machine or the like having in combination, a main carriage, a sheet-carrying carriage adapted to be displaceable in common with or independently of said main carriage, forwarding rollers on said sheet-carrying carriage, a shift device actuating said forwarding rollers, together with a throw-in lever, said shift device being actuated by said throw-in lever in any position of the carriage a comparatively great distance and by the movement of said sheet-carrying carriage a line space distance.

3. A typewriting-calculating machine, typewriting machine or the like having in combination, a main carriage, a sheet-carrying carriage adapted to be displaceable in common with or independently of said main carriage, a pair of shafts on said sheet-carrying carriage, forwarding rollers arranged on said shafts, a pair of wheels fixed on one of said shafts, a throw-in lever positively interconnected with one of said wheels, and a one-way pawl automatically operated during the travel of said carriages and cooperating with the other of said wheels.

4. A typewriting-calculating machine, typewriting machine or the like having in combination, a main carriage, a sheet-carrying carriage adapted to be displaceable in common with or independently of said main carriage, forwarding rollers on said sheet carrying carriage, a shift wheel and a toothed wheel operatively interconnected with said forwarding rollers, a throw-in lever inter-connected with said toothed wheel for actuating said forwarding rollers, a slide, a one-way pawl on said slide co-acting with said shift-wheel, a roller on said slide, together with a stationary cam surface co-acting with said roller.

5. A typewriting-calculating machine, typewriting machine or the like having in combination, a main carriage, a sheet-carrying carriage adapted to be displaceable in common with or independently of said main carriage, forwarding rollers on said sheet-carrying carriage, means co-acting with the movement of said sheet-carrying carriage for actuating said forwarding rollers, means for actuating said forwarding rollers independent of said sheet-carrying carriage movement, together with means for rendering said first-mentioned roller actuating means inoperative in a certain position of said second-mentioned roller actuating means.

6. In a typewriting-calculating machine, typewriting machine or the like having in combination, a main carriage, a platen on said carriage, an auxiliary carriage, a pair of forwarding rollers on said auxiliary carriage arranged above said platen, a pair of rods on said main carriage slidably supporting said auxiliary carriage, one of said rods being hollow, yieldable driving means housed in said hollow rod and adapted to act on the auxiliary carriage, and locking means on the other rod for holding said auxiliary carriage against movement under the influence of said driving means.

7. In a typewriting-calculating machine, typewriting machine or the like having in combination, a main carriage, a platen on said main carriage, a swingable frame on said main carriage above said platen, an auxiliary carriage slidably mounted on said swingable frame, locking means for holding said swingable frame in operative position with said platen, and means adapted to release said locking means in the extreme right-hand position of said main carriage.

8. In a typewriting-calculating machine, typewriting machine or the like having a main carriage and a sheet carrying auxiliary carriage displaceable in common with or independently of said main carriage, displacing means for said sheet carrying auxiliary carriage, means for retaining said auxiliary carriage in adjusted position against the action of said displacing means, said retaining means including a pair of connected pawls, one of said pawls being automatically lifted by the carriage movement and the other pawl acting as a rebound pawl.

9. In a typewriting-calculating machine, typewriting machine or the like having a main carriage and a sheet carrying auxiliary carriage displaceable in common with or independently of said main carriage, displacing means for said sheet carrying auxiliary carriage, means for retaining said auxiliary carriage in adjusted position against the action of said displacing means, said retaining means including a pair of connected pawls, a rod having notches for each of said pawls, said rod being mounted so as to be readily exchangeable, one of said pawls being automatically lifted by the carriage movement and the other pawl acting as a rebound pawl.

10. In a typewriting-calculating machine, typewriting machine or the like having a main carriage, a sheet carrying carriage displaceable in common with or independently of the main carriage, slide rods mounting said sheet carrying carriage for movement independently of the main carriage, displacing means for the sheet carrying carriage, means for retaining said sheet carrying carriage in adjusted position against the action of said displacing means, said retaining means including a pair of pawls, one of said slide rods being notched and adapted to coact with said pawls, line shift mechanism for said main carriage, and means operable by said line shift mechanism for rendering said pawls inoperative.

11. In a typewriting-calculating machine, typewriting machine or the like having a main carriage, a sheet carrying carriage displaceable in common with or independently of the main carriage, slide rods mounting said sheet carrying carriage for movement independently of the main carriage, displacing means for the sheet carrying carriage, means for retaining said sheet carrying carriage in adjusted position against the action of said displaceable means, said retaining means including a pair of pawls, one of said slide rods being notched and adapted to coact with said pawls, a carriage return mechanism for said main carriage, a line space lever for said main carriage, connections between said carriage return mechanism and said line space lever, and means operable by said line space lever for rendering said pawls inoperative.

12. In a typewriting-calculating machine, typewriting machine or the like having a main carriage, a sheet carrying carriage displaceable with or independently of said main carriage, slide rods slidably supporting the sheet carrying carriage, and having notches in at least one of said rods, displacing means for said sheet carrying carriage, means for retaining said sheet carrying carriage in adjusted position against the action of said displacing means, said retaining means including a pair of pawls cooperating with the notches of said slide rod, a line shift lever for said main carriage, a member operatively disposed between said line shift lever and said pawls, said member having a plurality of operating surfaces disposed opposite the notches in said slide rod for actuating said pawls.

13. In a typewriting-calculating machine, typewriting machine or the like having a main carriage, slide rods in said carriage, one of said rods having notches therein, a sheet carrying carriage displaceable with or independently of said main carriage on said slide rods, displacing means for the sheet carrying carriage, means for retaining said sheet carrying carriage in adjusted position against the action of said displacing means, said retaining means including a pair of pawls cooperating with the notches of said slide rod, line shift mechanism, means coacting with said line shift mechanism for rendering said pawls inoperative, said coacting means including a member extending substantially the entire length of the main carriage, and a hand grip on said member for returning said main carriage.

14. In a typewriting-calculating machine, typewriting machine or the like having a main carriage, a sheet carrying carriage displaceable in common with or independently of said main carriage, slide rods movably supporting the sheet carrying carriage, one of said rods having notches therein, displacing means for said sheet carrying carriage, means for retaining said sheet carrying carriage in adjusted position against the action of the displacing means, said retaining means including a pair of pawls cooperating with said notches, and a stationary cam for lifting said pawls out of said notches during movement of the main and sheet carrying carriages in letter feed direction, said cam being adapted to be brought into and out of operative position in relation to said pawls.

15. In a typewriting-calculating machine, typewriting machine or the like, the combination of a main carriage and a sheet carrying carriage displaceable in common with or independently of said main carriage, said sheet carrying carriage including a frame movable to an outswung position, a pivot locking lever having a recess therein, and a stud on said frame, said stud being engageable in the recess in said lever to lock said frame in its outswung position.

16. In a machine of the class described, a main carriage, a platen on said main carriage, a swingable frame on said main carriage, an auxiliary carriage on said swingable frame adapted for movement with said main carriage and shiftable independently thereof, said swingable frame comprising a pair of rods and a pair of side plates, curved members connecting said rods at spaced points, and presser rollers on one of said rods, said rollers and curved members being adapted to guide a sheet on said platen.

ROBERT ANSCHÜTZ.